United States Patent [19]
Montgomery

[11] 3,905,639
[45] Sept. 16, 1975

[54] VENTILATED ASHTRAY FOR AUTOMOBILES

[76] Inventor: Michael D. Montgomery, 702 Forest, Olathe, Kans. 66061

[22] Filed: May 7, 1973

[21] Appl. No.: 357,592

[52] U.S. Cl.................................. 296/37 R; 15/313
[51] Int. Cl.².............................................. B60S 1/64
[58] Field of Search..... 224/29 R, 29 D, 29 H, 29 J, 224/29 K, 29 L, 29 I; 232/37, 43.2, 43.1, 1 R, 36; 15/313; 131/231, 242; 296/37

[56] References Cited
UNITED STATES PATENTS

| | | | |
|---|---|---|---|
| 1,989,938 | 2/1935 | Marbach...................... | 224/29 D X |
| 2,299,668 | 10/1942 | Webster........................ | 224/29 H X |
| 2,559,178 | 7/1951 | Thompson.................... | 224/29 J X |
| 2,561,275 | 7/1951 | Hentschel.................... | 224/29 G X |

*Primary Examiner*—Robert J. Spar
*Assistant Examiner*—Jerold M. Forsberg
*Attorney, Agent, or Firm*—John A. Hamilton

[57] ABSTRACT

An ashtray system for automobiles consisting of an ash receptacle adapted to be mounted at an interior surface of the vehicle body, and a suction device adapted to be mounted at an exterior surface of the vehicle body and operable by wind currents generated by motion of the vehicle to induce an outward draft of air from the vehicle body, the ash receptacle being vented both to the vehicle interior and to the suction device. The ash receptacle may be sealed against the induced draft whenever desired.

8 Claims, 9 Drawing Figures

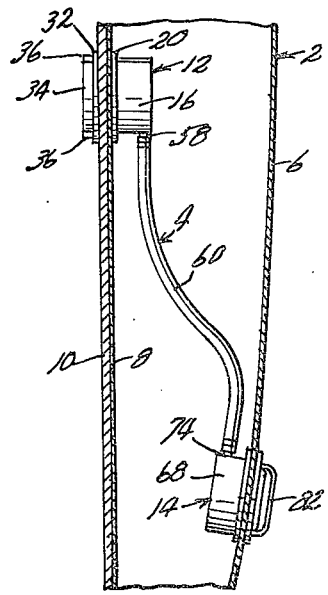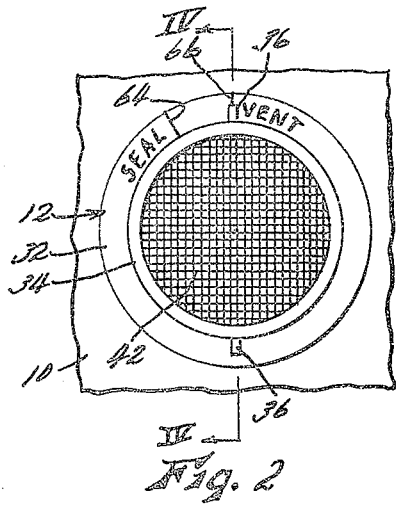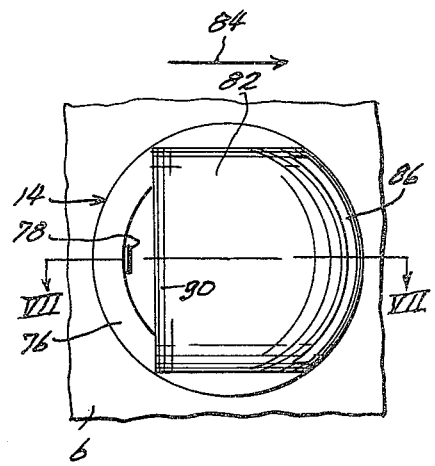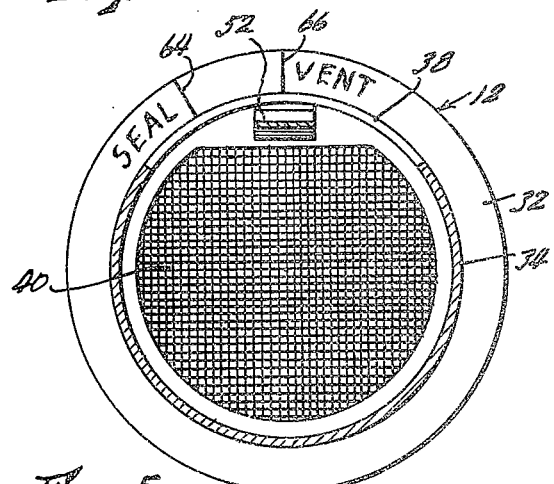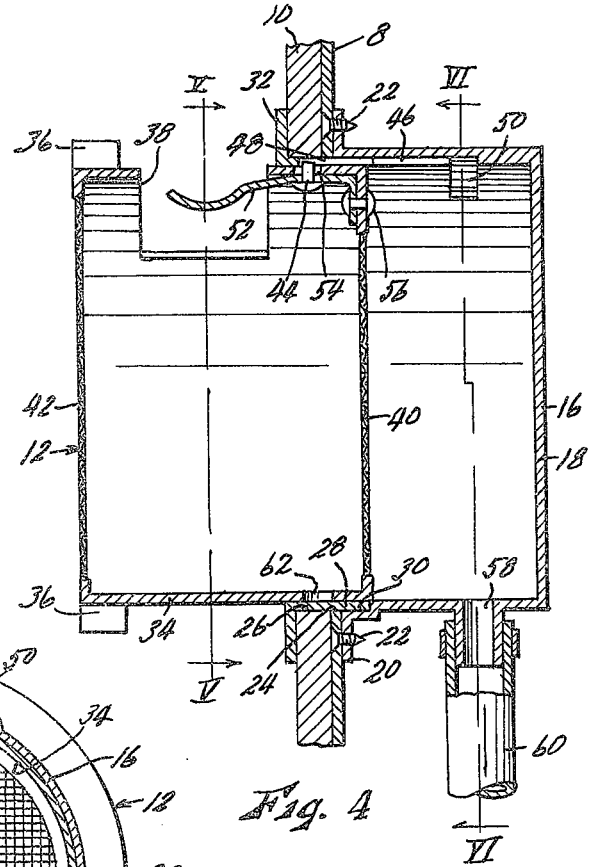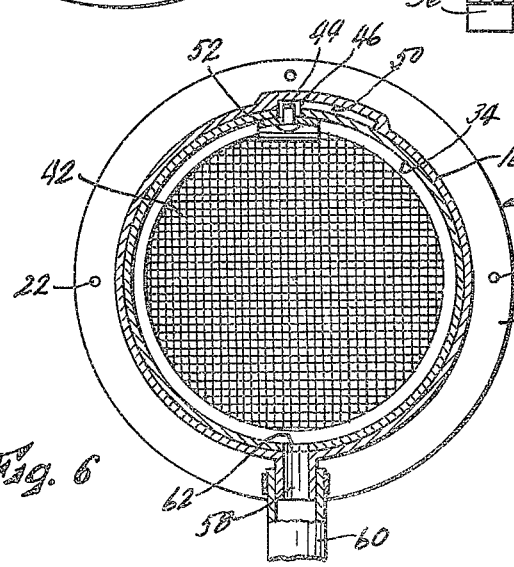

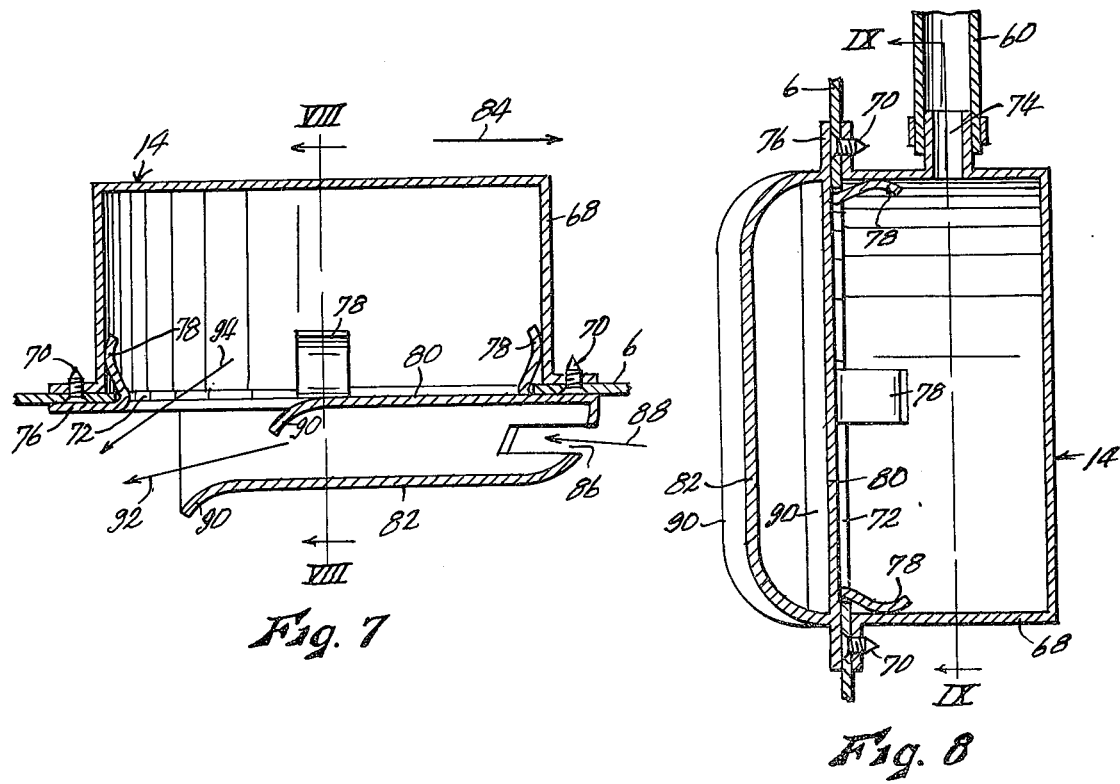
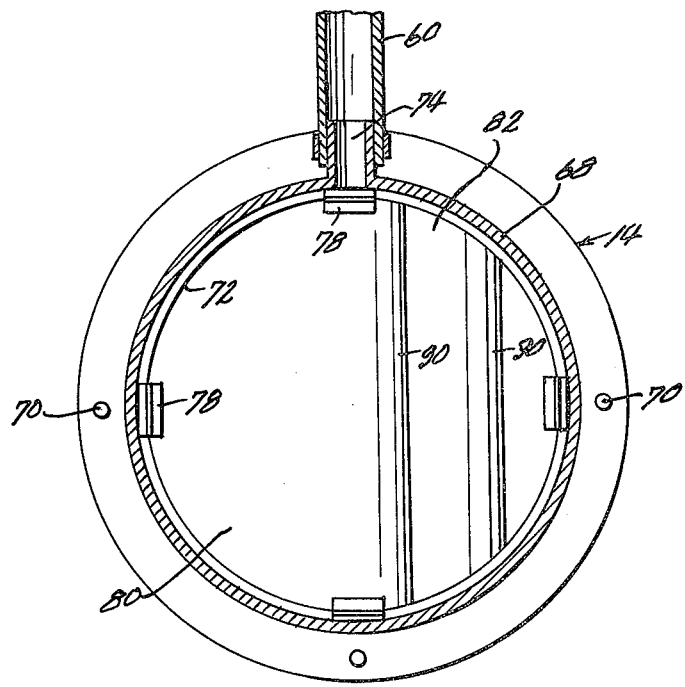

VENTILATED ASHTRAY FOR AUTOMOBILES

This invention relates to new and useful improvements in ashtrays for automobiles, and is directed to solution of the well known problem of ashtray odor in automobiles. An accumulation of ash, butts, and the like in automobile ashtrays is well known to give off an odor which is offensive even to persons who smoke, and of course doubly offensive to non-smokers, particularly when weather conditions dictate that for comfort the automobile windows should remain closed. Such odors are very pervasive, and tend to be generated and be distributed throughout the interior even when the ashtray is "closed" by normal means, such closure means for ashtrays seldom amounting to a true sealing of the ashtray.

The primary object of the present invention, therefore, is the provision of an automobile ashtray system that completely solves the problem described above.

Another object is the provision of an automobile ashtray system including means for generating an outward draft of air from the interior to the exterior of the vehicle body, and directing said draft through the ash receptacle of the tray. Not only does this prevent odors from escaping from the ash receptacle to the car body interior, but also it provides a general ventilation system for said interior, removing smoke and foul air from all portions thereof.

A further object is the provision of an automobile ashtray system of the character described wherein the operating draft is generated entirely by the forward speed of the vehicle itself, requiring no power whatsoever from the electrical or mechanical systems of the automobile.

A still further object is the provision of an automobile ashtray system of the character described including simple means for sealing off the operating draft whenever operation thereof might result in the removal from the vehicle interior of excessive quantities of heated air in very cold weather.

Other objects are simplicity and economy of construction, ease and convenience of use, and efficiency and dependability of operation.

With these objects in view, as well as other objects which will appear in the course of the specification, reference will be had to the accompanying drawing, wherein:

FIG. 1 is a fragmentary vertical sectional view of an automobile door, with parts omitted, showing an ashtray system embodying the present invention mounted operatively therein, FIG. 2 is an interior elevational view of the ash receptacle element of the system, FIG. 3 is an exterior elevational view of the draft producing element of the system, FIG. 4 is an enlarged fragmentary sectional view taken on line IV—IV of FIG. 2, with the ash receptacle extended for use, FIG. 5 is a slightly reduced sectional view taken on line V—V of FIG. 4, FIG. 6 is a slightly reduced sectional view taken on line VI—VI of FIG. 4, with the ash receptacle closed, FIG. 7 is an enlarged fragmentary sectional view taken on line VII—VII of FIG. 3, FIG. 8 is a sectional view taken on line VIII—VIII of FIG. 7, and FIG. 9 is a sectional view taken on line IX—IX of FIG. 8.

Like reference numerals apply to similar parts throughout the several views, and the numeral 2 applies generally in FIG. 1 to a vertical cross sectional view of a door of an automobile. While an ashtray system, indicated generally by the numeral 4, may be mounted in many portions of the wall of the passenger compartment of the vehicle, the doors thereof are perhaps most convenient, and it is illustrated as mounted in a door. The door 2 includes an outer wall 6 and an inner wall 8, formed of sheet metal, and inner wall 8 is generally provided with a decorative liner layer 10 of plastic, fiber board, or other suitable material. Walls 6 and 8 are spaced apart, and the space therebetween carries a window pane and its operating mechanism, door latch mechanism, and possibly other mechanism, none of which are shown, since they form no part of the present invention.

Ashtray system 4 includes an ash receptacle assembly indicated generally by the number 12, and a draft inducer assembly indicated generally by the numeral 14. Receptacle assembly 12 includes a holder 16 of cylindrical cup shape disposed between the door walls, being closed at one end by wall 18, and having an external flange 20 at its open end secured to wall 8 by sheet metal screws 22, whereby said holder registers with circular holes 24 and 26 formed respectively in wall 8 and liner 10, to communicate with the interior of the vehicle body. A sleeve 28 having the same internal diameter as the holder is press fitted into an interior enlargement 30 of the holder, extends outwardly through holes 24 and 26, and is provided at its extended end with an external flange which overlies the exposed surface of liner 10 to form a face plate 32. A cylindrical ash receptacle 34 is disposed coaxially in sleeve 28 and holder 16, for axial sliding and rotary movement therein. It may be pushed into the holder to abut end wall 18 of the latter, this position being represented in FIG. 1, or pulled outwardly to extend into the vehicle interior, as in FIG. 4. It may be pushed and pulled, or turned rotatably by means of radial ears 36 affixed to the extended end thereof. When extended, as in FIG. 4, a portion thereof is exposed in the top portion of which is formed a receiving opening 38 for accepting ashes, cigarette and cigar butts, and the like. This opening is disposed within holder 16 when the receptacle is pushed into the holder as in FIG. 1. Both the inner and outer ends of the receptacle cylinder are covered by screens, designated 40 and 42 respectively, of sufficiently fine mesh to pass only air and fine ash.

The outward extension of receptacle 34 is limited by a detent pin 44 carried thereby in the upper portion thereof and projecting upwardly therefrom into an interior groove 46 formed longitudinally in the cylindrical wall of holder 16. Said groove extends into sleeve 28, as at 48, and terminates short of the outer end of said sleeve to arrest the movement of pin 44 and hence the extension of receptacle 34. Said pin also prevents rotation of the receptacle, to prevent possible spillage of its contents through opening 38. However, groove 46 is provided, at the position thereof occupied by pin 44 when the receptacle is pressed fully into the holder, with a peripheral extension 50 of sufficient angular extent that the receptacle may be turned axially to a degree in the holder for a purpose which will presently appear. Detent pin 44 is affixed transversely in an elongated leaf spring 52 laying along the inner top surface of receptacle 34, so that the pin extends upwardly through a hole 54 formed in the receptacle wall to engage in grooves 46, 48, and 50. One end of said spring is affixed to the receptacle as by rivet 56, while its opposite end is free and lies just below opening 38. Thus a finger can be inserted through opening 38 to press the free end of the spring downwardly to free pin 44 from the holder grooves, and the receptacle can then be pulled free of the holder for emptying its contents whenever necessary. The free end of the spring can be shaped to form a cigarette rest, as shown.

Holder cup 16 is provided with an outlet neck 58 in the lower portion of its cylindrical wall, to which one end of a draft hose 60 is attached. Receptacle 34 is provided in the lower portion of its cylindrical wall with a hole 62. Said hole registers with neck 58 when the receptacle is pushed fully into the holder, and lies within sleeve 28 when the receptacle is extended. When the receptacle is pushed fully into the holder, hole 62 may be turned angularly out of registry with neck 58 by turning the receptacle bodily in the holder, so that detent pin 44 enters groove extension 50. This represents a "Seal" position, and is obtained by turning the receptacle so that one of ears 36 registers with a suitably labelled indicia mark 64 imprinted on face plate 32 (see FIGS. 2 and 5). Registry of hole 62 and neck 58 represents a "Vent" position, and is obtained by turning the receptacle to align ear 32 with a suitably labelled indicia mark 66 of the face plate.

Draft inducer assembly 14 includes a housing member 68, also of cylindrical cup form, and affixed to the interior surface of outer wall 6 of the door by sheet metal screws 70, so as to open outwardly through a circular hole 72 formed in wall 6. Said housing is provided at its top with a hose neck 74, to which the opposite end of hose 60 is interconnected. Hose 60 may be of small diameter, and should be flexible, so that it can be led around the door window and any other parts or mechanism disposed within the door to avoid interference with the movement or operation thereof. Also, the inward extension of holder 16 and housing 68 from their respective door walls should be sufficiently small not to interfere with the raising or lowering of the window.

Mounted in the mouth of housing 68 is a draft inducer including a ring plate 76 overlying the outer surface of wall 6 in encircling relation to hole 72, and secured releasably in place by spring clips 78 affixed thereto and projecting through hole 72 into housing 68. Affixed to ring 76 is a housing consisting of inner and outer plates 80 and 82 which overlie the forward portion of hole 72, as relates to the direction of travel of the vehicle, indicated by arrow 84 in FIGS. 3 and 7, but leaving the rearward portion of said hole uncovered. A slot 86 between the forward edges of plates 80 and 82 admits air currents generated by forward movement of the vehicle, as indicated by arrow 88 in FIG. 7. The rearward edges of plates 80 and 82 are turned outwardly to form lips 90 tending to divert air entering slot 86 outwardly from the vehicle, as indicated by arrow 92, and this in turn creates an aspirator effect tending to suck air outwardly from housing 68, as indicated by arrow 94.

In operation, it will be seen that whenever the automobile is moving forwardly, draft inducer assembly 14 will function as already described to create an outward draft from the vehicle interior, exhausting any smoke or fumes from the interior to the outside atmosphere, so long as there is an uninterrupted path for air through the receptacle assembly 12. Thus the system not only ventilates and exhausts fumes from the ash receptacle itself, but also from the entire interior space of the vehicle. Of course, the system suction must be "fed" by air entering the vehicle body at some other point. Ordinarily, there is enough air leakage into the body around the doors for this purpose, but also some cars have provision for admitting outside air in a ventilation system, or if necessary a window could be opened very slightly.

There will of course be the required air passage through receptacle assembly 12 whenever receptacle 34 is extended for use as in FIG. 4, the air entering the receptacle through screen 42 and opening 38, and exiting through screen 40 to holder 16 and neck 58 to hose 60. The venting action continues even when receptacle 34 is pressed into the holder as in FIG. 1, since then the receptacle interior is vented to neck 58 and hose 60 through receptacle hole 62. This permits the ashtray to be "closed," while still providing for the disposition of any smoke or odors still present in the vehicle, or developing from any material left burning or smoldering in the ash receptacle itself. It is of course the provision of this venting action when the receptacle is "closed" that necessitates the use of screen 42 in the exposed end of receptacle 34. If such venting in the "closed" position were not desired, then the outer end of receptacle 34 could be a solid wall. In either "vent" position of the receptacle, however, screen 42 does not permit the escape of even the fine ash which could pass therethrough into the vehicle interior, due to the constant reverse draft therethrough. Hole 62 is of course larger than the screen apertures, and can pass larger material than the screen. However, it need not be large enough to admit or pass cigarette butts, and will not ordinarily become clogged. Also, it could be provided with a screen cover if desired.

When the receptacle 34 is pushed into its holder 16 as in FIG. 1, an ear 36 thereof can be turned to the "Seal" mark 64 on the face plate, and this turns receptacle hole 62 out of registry with hose neck 58, so that the draft through the receptacle is cut off. Ordinarily, this would be done only rarely, as for example in very cold weather, when the draft of the ashtray system might draw heated air from the vehicle more rapidly than the heat could be replaced by the car heater, or when the car is parked and wind from some directions might cause an inward flow of air in hose 60 tending to discharge ash receptacle odors into the interior.

Receptacle 34 can of course be removed from emptying of its contents whenever desired by pressing inwardly on the free end of leaf spring 52, as previously described. Also, the ring plate 76 and plates 80 and 82 can be removed from housing 68 of the draft inducer assembly, as permitted by spring clips 78, in order to permit removal of any debris which may collect in housing 68 of the assembly.

While I have shown and described a specific embodiment of my invention, it will be readily apparent that many minor changes of structure and operation could be made without departing from the spirit of the invention.

What I claim as new and desired to protect by letters Patent is:

1. An ashtray system for an automobile comprising:

a. an ash receptacle adapted to be mounted interiorly of the body of said automobile for use by its occupants,
b. means operable to induce a draft from the vehicle interior, through said ash receptacle, and to discharge it exteriorly of the vehicle body,
c. a holder for said receptacle adapted to be mounted inside a wall of the body of the vehicle, and opening into the interior of said body, said receptacle being mounted in said holder for movement between an extended position projecting into the body interior, and a closed position generally enclosed within said holder, and having an ash reception opening in the portion thereof exposed when in its extended position, said holder being connected at its inner end portion to said draft inducing means,
d. an air permeable member covering the inner end of said receptacle, whereby when said receptacle is in its extended position, air from the body interior can pass through said ash reception opening and through said air permeable closure member to said draft inducing means, and
e. said receptacle is rotatably movable when in its retracted position relative to said holder to a position in which the connection of said holder to draft means is severed.

2. A system as recited in claim 1 wherein an end of said receptacle toward the body interior, always exposed thereto, is also provided with an air permeable closure, whereby air can pass therethrough to said draft inducing means when the receptacle is in its closed position.

3. A system as recited in claim 1 wherein said holder has the form of a hollow cylinder disposed generally normally to the body wall and opening into the body interior, its connection to said draft inducing means being through the cylindrical wall thereof, and wherein said ash receptacle is also of hollow cylindrical form and is disposed coaxially within said holder for axial sliding and rotary motion therein, both ends of said receptacle being covered by air permable closures, and the cylindrical wall thereof having said ash reception opening formed in a portion thereof which is exposed at the body interior only when the receptacle is in its extended position, and a draft opening which registers with the draft connection of said holder only when the receptacle is in its closed position and at one angular rotative position, whereby when said receptacle is angularly turned in its closed position, the draft opening thereof is moved out of registry with the draft connection of said holder, said receptacle leaving the draft connection of the holder unobstructed when the receptacle is in its extended position.

4. A system as recited in claim 3 with the addition of a detent carried by said receptacle and cooperating with a groove formed in said holder to limit the extension of said receptacle from said holder, and to lock said receptacle against rotation in holder except when said receptacle is in its closed position.

5. A system as recited in claim 4 wherein said detent is carried movably by said receptacle, whereby to be manually retractable from said holder groove to permit full removal of said receptacle from said holder.

6. A system as recited in claim 1 wherein said draft inducing means comprises an aspirator suction device operable by wind currents past the vehicle body generated by forward motion of said vehicle.

7. A system as recited in claim 1 wherein said draft inducing means comprises:
   a. an air conduit interconnected with said ash receptacle and extending through the thickness of the vehicle wall to open transversely through the outer surface of said wall, the surface of said wall being generally parallel to the direction of vehicle travel, and
   b. air deflector means arranged over the outer opening of said air conduit and operable to deflect wind currents generated by forward motion of the vehicle across said outer conduit opening to create a suction capable of drawing air outwardly through said conduit.

8. A system as recited in claim 7 wherein at least a portion of said air conduit comprises a flexible hose, whereby to accommodate to and avoid interference with any automobile mechanism disposed within said wall.

* * * * *